(12) United States Patent
Zhang et al.

(10) Patent No.: US 11,131,442 B2
(45) Date of Patent: Sep. 28, 2021

(54) WIDE ANGLE BACKLIGHT LENS

(71) Applicant: SHENZHEN MINGZHI ULTRA PRECISION TECHNOLOGY CO., LTD., Shenzhen (CN)

(72) Inventors: Zhicai Zhang, Shenzhen (CN); Yongxin Peng, Shenzhen (CN); Zuzhou Zhang, Shenzhen (CN); Baojian Liu, Shenzhen (CN); Zuqiang Zhang, Shenzhen (CN); Chunlin Wang, Shenzhen (CN); Zhi'an Zhang, Shenzhen (CN)

( * ) Notice: Subject to any disclaimer, the term of this patent is extended or adjusted under 35 U.S.C. 154(b) by 240 days.

(21) Appl. No.: 16/425,392

(22) Filed: May 29, 2019

(65) Prior Publication Data
US 2020/0379221 A1 Dec. 3, 2020

(51) Int. Cl.
*F21V 5/00* (2018.01)
*F21V 15/01* (2006.01)
*F21V 5/04* (2006.01)
*F21V 13/04* (2006.01)

(52) U.S. Cl.
CPC ............... *F21V 15/01* (2013.01); *F21V 5/04* (2013.01); *F21V 13/04* (2013.01)

(58) Field of Classification Search
CPC . F21V 5/04; F21V 15/01; F21V 13/04; F21V 5/00; F21V 5/048; F21V 3/02; F21Y 2115/10
See application file for complete search history.

(56) References Cited

U.S. PATENT DOCUMENTS

| | | | | |
|---|---|---|---|---|
| 2006/0193137 A1* | 8/2006 | Chinniah | ........... | F21V 5/04 362/326 |
| 2014/0126222 A1* | 5/2014 | Wang | ........... | F21V 5/04 362/311.09 |
| 2014/0301085 A1* | 10/2014 | Hwang | ........... | F21V 5/046 362/308 |
| 2015/0055347 A1* | 2/2015 | Kim | ........... | F21V 19/0015 362/293 |
| 2020/0348566 A1* | 11/2020 | Mochida | ........... | F21V 3/00 |

\* cited by examiner

*Primary Examiner* — Y M. Quach Lee
(74) *Attorney, Agent, or Firm* — W&K IP

(57) ABSTRACT

The present invention discloses a wide angle backlight lens which consists of lens mounting plate and lens body. Further, the upper outer surface of lens body is fixedly connected with the central position of the lower outer surface of lens mounting plate. Four sets of lens stands are installed near four corners of the upper outer surface of said lens mounting plate. Each set of said lens stands consists of two assembling stands. The luminous slot (4) is installed in the central position of the lower outer surface of said lens body (2) and lamp mounting slot (5) and reflective aperture (6) are installed in the central position of the upper outer surface of said lens mounting plate (1). A wide angle backlight lens described in the present invention is available for convergence and divergence of light rays according to actual needs, to improve the range of light diffusion and luminous intensity, hence realizing a higher uniformity of flares. Further, in respect of assembly, it could reduce the width of PCB, and direction detection is not required when the lens is travelling along the vibration plate rail, hence improving lens mounting efficiency and bringing a better application prospect.

6 Claims, 6 Drawing Sheets

A wavy aperture featuring an aspheric free-form surface

WIDE ANGLE BACKLIGHT LENS

FIELD OF THE INVENTION

The present invention relates to the LED light source area, in particular, a wide angle backlight lens.

BACKGROUND OF THE INVENTION

With the development of the society, people's living standard is improving constantly and the lighting industry also has recorded a rapid development. LED lights have become a new lighting energy. LED lights featuring a long service life, high energy efficiency and low energy consumption have become necessities in people's life. With the development of LED lights, currently LED lamp chip is gradually applied in backlight for lighting. Therefore, people invented backlight lenses for backlight. With the rapid development of technology, people proposed higher and higher requirements for backlight lens, therefore, existing backlight lenses cannot satisfy people's application requirements;

Existing backlight lenses are subject to certain defects in applications. Most existing backlight lenses applied a sphere to reflect a convergent beam of the light rays, with a small range of light diffusion, low luminous intensity and non-uniform flares; further, PCB plate corresponding to existing backlight lens has a minimum width of 15 mm, a relatively large volume, and a small mounting scope, failing to satisfy people's application requirements in modern times. In view of the above, we proposed a wide angle backlight lens.

SUMMARY OF THE INVENTION

The purpose of the present invention was mainly to provide a wide angle backlight lens which is capable of addressing issues described in Background of the Invention.

In order to achieve the above purpose, the following technical solution has been adopted in the present invention:

A wide angle backlight lens consists of lens mounting plate and lens body. Further, the lower outer surface of lens body is fixedly connected with the central portion of the lower outer surface of the lens mounting plate. Four sets of lens stands are installed near four corners of the lower outer surface of said lens mounting plate. Each set of said lens stands consists of two assembling stands. Luminous slot is installed in the central portion of the lower outer surface of said lens body. Lamp mounting slot and reflective aperture are installed in the central portion of the lower outer surface of said lens mounting plate; and reflective aperture is installed outside lamp mounting slot.

Preferably, said luminous slot is frustum cone-shaped; said lamp mounting slot is cylinder-shaped, and the inner bottom surfaces of both luminous slot and lamp mounting slot are aspheric free-form surfaces.

Preferably, said reflective aperture is a wavy aperture featuring an aspheric free-form surface; certain sets of reflective lines are set on the outer surface of said lens body.

Preferably, said lens mounting plate is cuboid-shaped; said lens is cylinder-shaped.

Preferably, the center of said reflective aperture is aligned with the center of lamp mounting slot, lens body and luminous slot on the same axis.

Preferably, said eight assembling stands constitute two mutually-perpendicular cuboids of the same length and width; the length and width of the cuboids formed by said assembling stands are 12.5 mm and 9 mm, respectively.

As compared with existing technology, the present invention provides a wide angle backlight lens with the following beneficial effects:

1. Lens stands of the backlight lens are designed as two mutually-perpendicular rectangles comprising eight assembling stands. In assembling, the rectangle formed by assembling stands is corresponding to the rectangular PCB plate, i.e., dispensing positions on the PCB plate are the four points of the rectangle formed by assembling stands. The width of PCB plate only needs to be larger than that of the rectangle formed by assembling stands. In terms of assembling, the width of PCB plate is reduced, and direction detection is not required when the lens with eight assembling stands is travelling along the vibration plate rail, hence improving lens mounting efficiency;

2. Reflective aperture is designed as a wavy aperture featuring an aspheric free-form surface; the inner bottom surfaces of both luminous slot and lamp mounting slot are aspheric free-form surfaces. Light rays reflected by an aspheric surface are available for convergence and divergence of light rays according to actual needs, so as to improve the range of light diffusion and luminous intensity, hence realizing a higher uniformity of flares. Further, the whole wide angle backlight lens has a simpler structure, and is easy-to-operate and practical, with relatively better use effects, as compared with traditional system, satisfying people's application requirements.

All components in the device which the present invention does not relate to are identical to existing technology or can be realized by utilizing existing technology.

Wherein, 1. lens mounting plate; 2. lens body; 3. assembling stands; 4. luminous slot; 5. lamp mounting slot; 6. reflective aperture.

DETAILED DESCRIPTION OF THE PREFERRED EMBODIMENTS

Next, in light of the drawings attached in the embodiments of the present invention, we will clearly and completely describe the technical solution in the embodiments of the present invention. Apparently, the embodiments described are just certain embodiments of the present invention other than all embodiments.

In the description of the present invention, it should be understood that the terms "upper", "lower", "front", "rear", "left", "right", "top", "bottom", "inner" and "outer" and other direction or position relationship are direction or position relationships based on such drawings, only for easy description of the present invention and simplified description other than instruction or suggestion of a specific direction of the device or component and construction and operation at a specific direction. Therefore, they should not be interpreted as limitations to the present invention.

Embodiment 1

Figure 1:
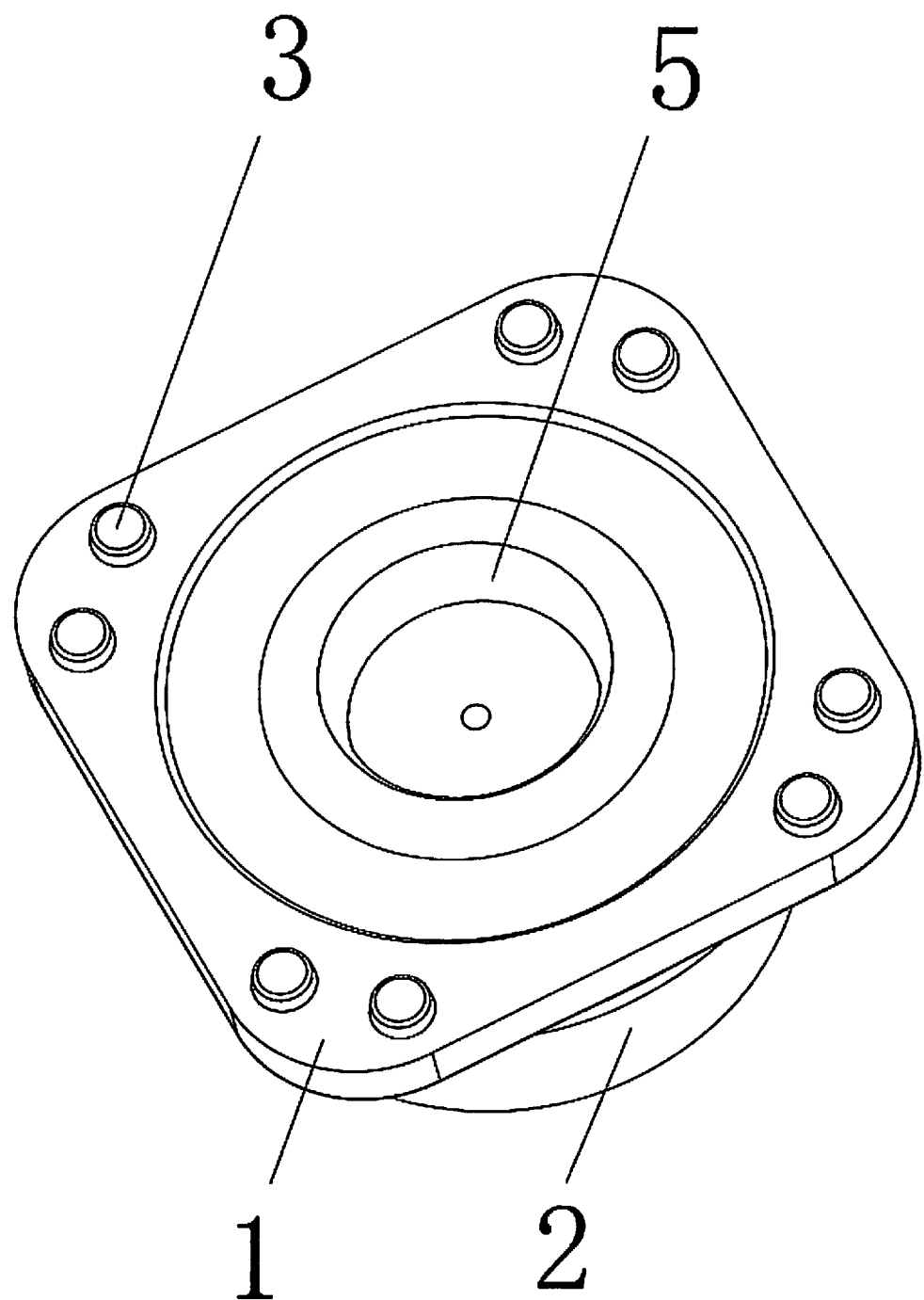
FIG. 1 is a schematic view depicting the overall structure of a wide angle backlight lens of the present invention.
Figure 2:
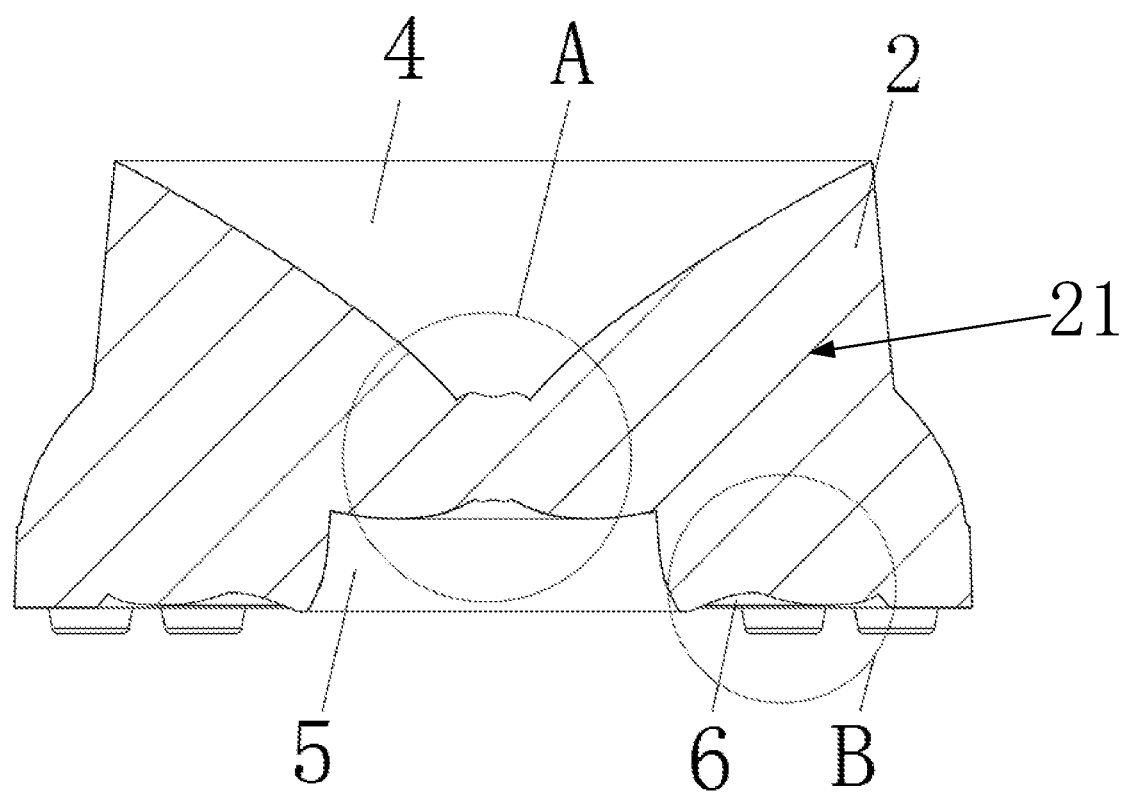
FIG. 2 is a sectional view through a wide angle backlight lens of the present invention.
Figure 3:
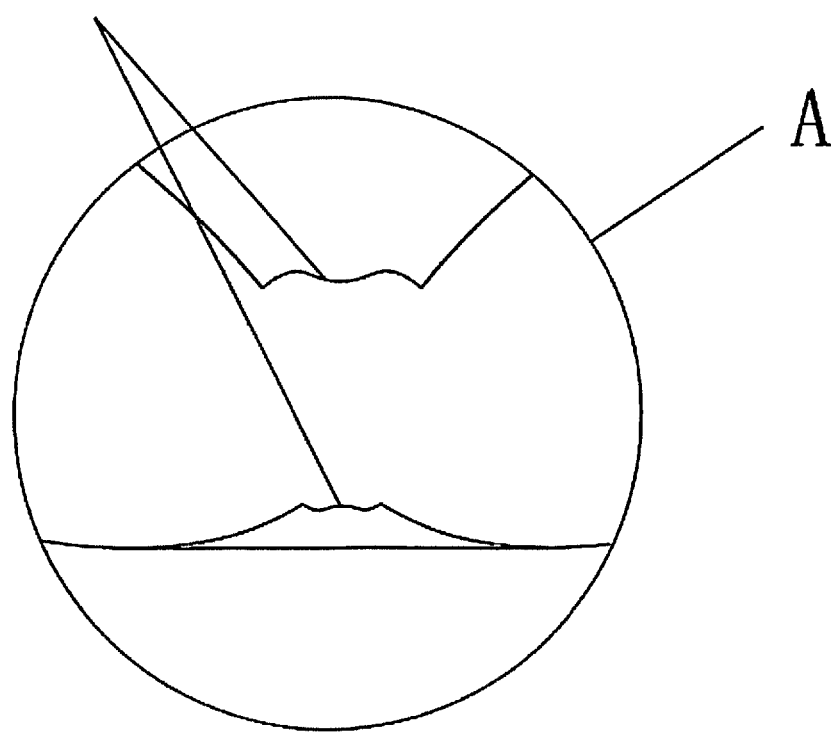
FIG. 3 is an enlarged view of A of a wide angle backlight lens of the present invention shown in FIG. 2
Figure 4:
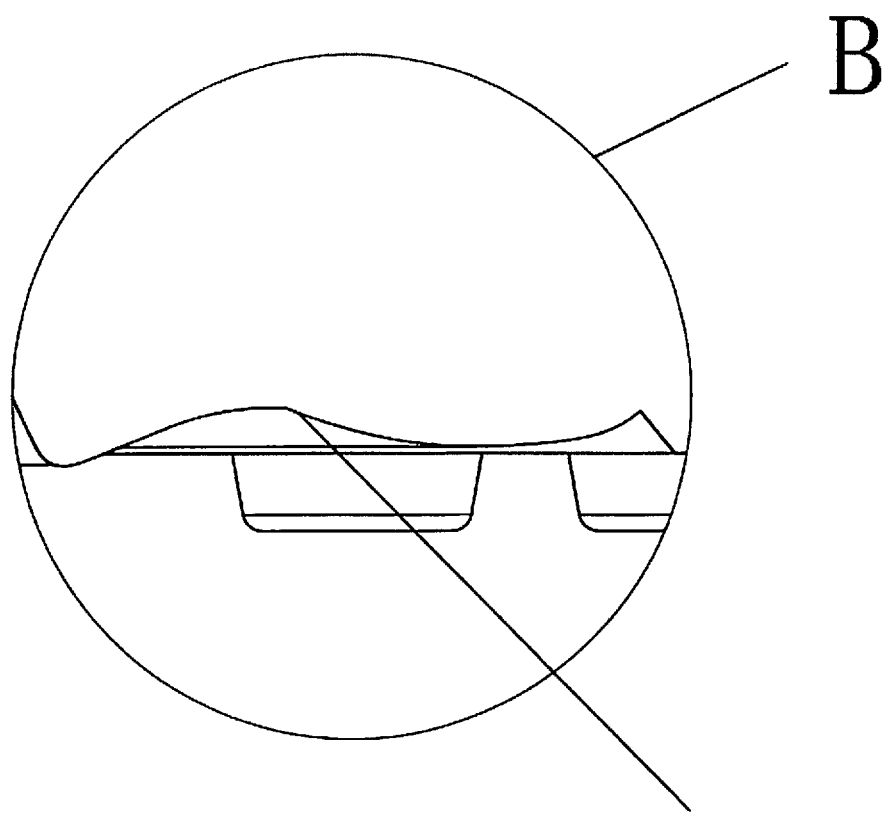
FIG. 4 is an enlarged view of B of a wide angle backlight lens of the present invention shown in FIG. 2
Figure 5:
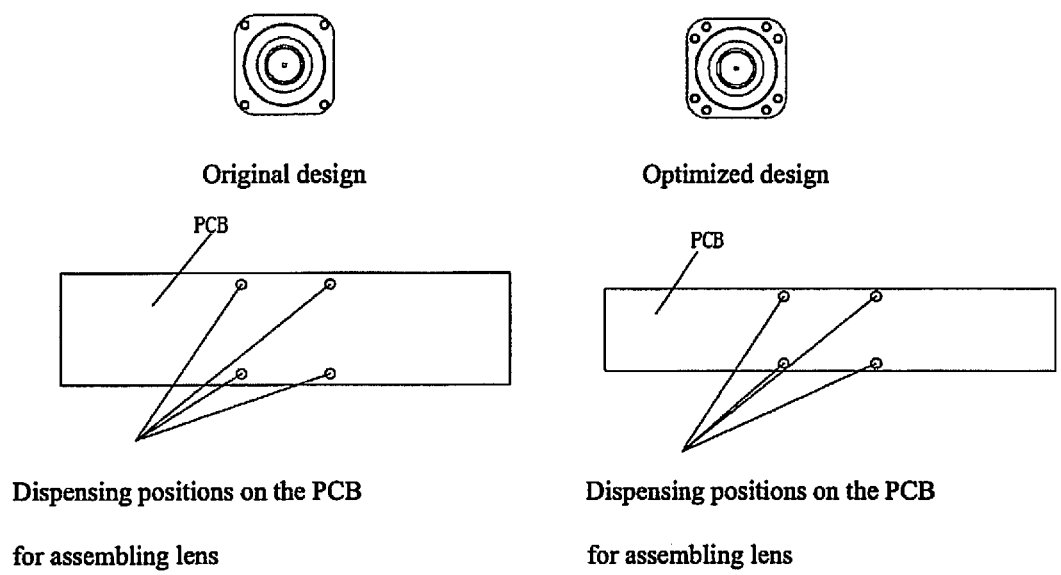
FIG. 5 is a comparison diagram of assembling stands of a wide angle backlight lens of the present invention and existing backlight lens.
Figure 6:
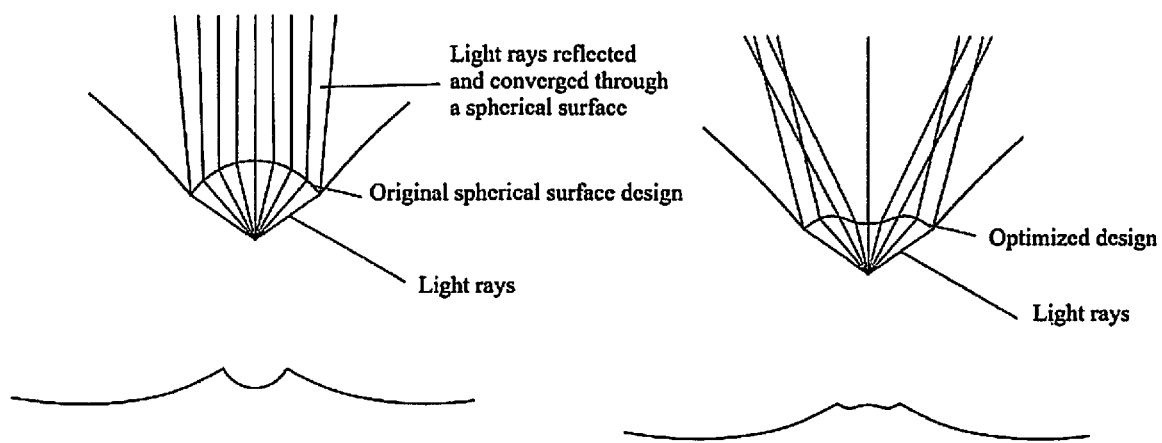
FIG. 6 is a comparison diagram of the luminous surface of luminous slot of a wide angle backlight lens of the present invention and existing backlight lens.

Referring to FIG. 1-6, a wide angle backlight lens comprising lens mounting plate 1 and lens body 2, with the lower outer surface of lens body 2 fixedly connected with the central portion of the upper outer surface of the lens mounting plate 1, is characterized in that: four sets of lens stands are installed near four corners of the lower outer surface of lens mounting plate 1; each set of said lens stands consists of two assembling stands 3; luminous slot 4 is installed in the central portion of the upper outer surface of lens body 2; lamp mounting slot 5 and reflective aperture 6 are installed in the central portion of the lower outer surface of lens mounting plate 1; and reflective aperture 6 is installed outside the lamp mounting slot 5.

Eight assembling stands 3 constitute two mutually-perpendicular cuboids of the same length and width; the length and width of the cuboids formed by assembling stands 3 are 12.5 mm and 9 mm, respectively.

Lens mounting plate 1 is cuboid-shaped; lens body 2 is cylinder-shaped.

The center of reflective aperture 6 is aligned with the center of lamp mounting slot 5, lens body 2 and luminous slot 4 on the same axis.

Lens stands of the backlight lens are designed as two mutually-perpendicular rectangles comprising eight assembling stands 3. In assembling, the rectangle formed by 4 sets of assembling stands 3 is corresponding to the rectangular PCB plate, i.e., dispensing positions on the PCB plate are the four points of the rectangle formed by 4 sets of assembling stands 3. The width of PCB plate only needs to be larger than that of the rectangle formed by assembling stands 3. In terms of assembling, the width of PCB plate is reduced, and direction detection is not required when the lens with eight assembling stands 3 is travelling along the vibration plate rail, hence improving lens mounting efficiency.

Embodiment 2

Referring to FIG. 1-6, a wide angle backlight lens, based on Embodiment 1, is characterized in that: luminous slot 4 is frustum cone-shaped; lamp mounting slot 5 is cylinder-shaped; and the inner bottom surfaces of both luminous slot 4 and lamp mounting slot 5 are aspheric free-form surfaces.

Reflective aperture 6 is a wavy aperture featuring an aspheric free-form surface, which enables diffuse reflection of light rays on the bottom reflecting surface, so as to form more uniform flares. Certain sets of reflective lines 21 are set on the outer surface of lens body 2.

Reflective aperture 6 is designed as a wavy aperture featuring an aspheric free-form surface; the inner bottom surfaces of both luminous slot 4 and lamp mounting slot are designed as aspheric free-form surfaces. Light rays reflected by an aspheric surface are available for convergence and divergence of light rays according to actual needs, so as to improve the range of light diffusion and luminous intensity, hence realizing a higher uniformity of flares. Further, the whole wide angle backlight lens has a simpler structure, and is easy-to-operate and practical, with better use effects, as compared with traditional system, satisfying people's application requirements.

It should be noted that the present invention relates to a wide angle backlight lens; in application, at first, the center of the wide angle backlight lens should be aligned with the center of LED lamp through assembling stands 3 on the same axis. When LED chip operates and glows, light rays from the LED chip will be subject to diffuse reflection through the bottom surfaces of lamp mounting slot 5 and reflective aperture 6, to diverge light rays; then light rays will be transmitted through the bottom surface of luminous slot 4, to realize light diffusion;

Reflective aperture 6 is designed as a wavy aperture featuring an aspheric free-form surface; the inner bottom surfaces of both luminous slot 4 and lamp mounting slot 5 are designed as aspheric free-form surfaces. In the process of application of wide angle backlight lens, light rays are subject to diffuse reflection through both wavy aperture featuring an aspheric free-form surface and aspheric free-form surfaces, to form more uniform flares. Further, light rays reflected by an aspheric surface are available for convergence and divergence of light rays according to actual needs, to improve the range of light diffusion and luminous intensity, hence realizing a higher uniformity of flares;

Lens stands of the backlight lens are designed as two mutually-perpendicular rectangles comprising eight assembling stands 3. In assembling, the rectangle formed by four sets of assembling stands 3 is corresponding to the rectangular PCB plate, i.e., dispensing positions on the PCB plate are the four points of the rectangle formed by four sets of assembling stands 3. The width of PCB plate only needs to be larger than that of the rectangle formed by assembling stands 3. In terms of assembling, the width of PCB plate is reduced, and direction detection is not required when the lens with eight assembling stands 3 is travelling along the vibration plate rail, hence improving lens mounting efficiency. Further, the whole wide angle backlight lens has a simpler structure, and is easy-to-operate and practical, with better use effects, as compared with traditional system, satisfying people's application requirements.

The above displays and describes the basic principles, main characteristics and the strengths of the present invention. Technicians of the industry should note that the present invention is not subject to the limitation of the above embodiments. Above embodiments and what described in the Description just refer to principles of the present invention. On the premise of not deviating from the spirit and scope of the present invention, the present invention is further subject to various changes and improvements. Such changes and improvements will fall within the scope of the present invention to the protected. The scope of the present invention to be protected is to be determined by the enclosed claims and its equivalent.

The invention claimed is:

1. A wide angle backlight lens, comprising a lens mounting plate and a lens body, with a lower outer surface of the lens body fixedly connected with a central portion of an upper outer surface of the lens mounting plate, wherein four sets of lens stands are installed near four corners of a lower outer surface of the lens mounting plate; wherein each set of the lens stands consists of two assembling stands; wherein a luminous slot is defined in a central portion of an upper outer surface of the lens body; wherein a lamp mounting slot and a reflective aperture are defined in a central portion of a lower outer surface of the lens mounting plate, and the reflective aperture is defined outside the lamp mounting slot;

wherein the eight assembling stands constitute two mutually-perpendicular cuboids of the same length and width.

2. The wide angle backlight lens according to claim 1, wherein the luminous slot is frustum cone-shaped; the lamp mounting slot is cylinder-shaped; and inner bottom surfaces of both the luminous slot and the lamp mounting slot are aspheric free-form surfaces.

3. The wide angle backlight lens according to claim 1, wherein the reflective aperture is a wavy aperture featuring an aspheric free-form surface; and a plurality of sets of reflective lines are set on the outer surface of said lens body.

4. The wide angle backlight lens according to claim 1, wherein the lens mounting plate is cuboid-shaped; and the lens body is cylinder-shaped.

5. The wide angle backlight lens according to claim 1, wherein a center of the reflective aperture is aligned with a center of the lamp mounting slot, the lens body and the luminous slot on the same axis.

6. The wide angle backlight lens according to claim 1, wherein the cuboids formed by the assembling stands have a length of 12.5 mm and the cuboids formed by the assembling stands have a width of 9 mm.

* * * * *